Jan. 13, 1931.  A. BAUM  1,788,558
HOT AIR MOTOR
Filed Nov. 23, 1926  3 Sheets-Sheet 1

Inventor
August Baum
by Henry Mech
Attorney.

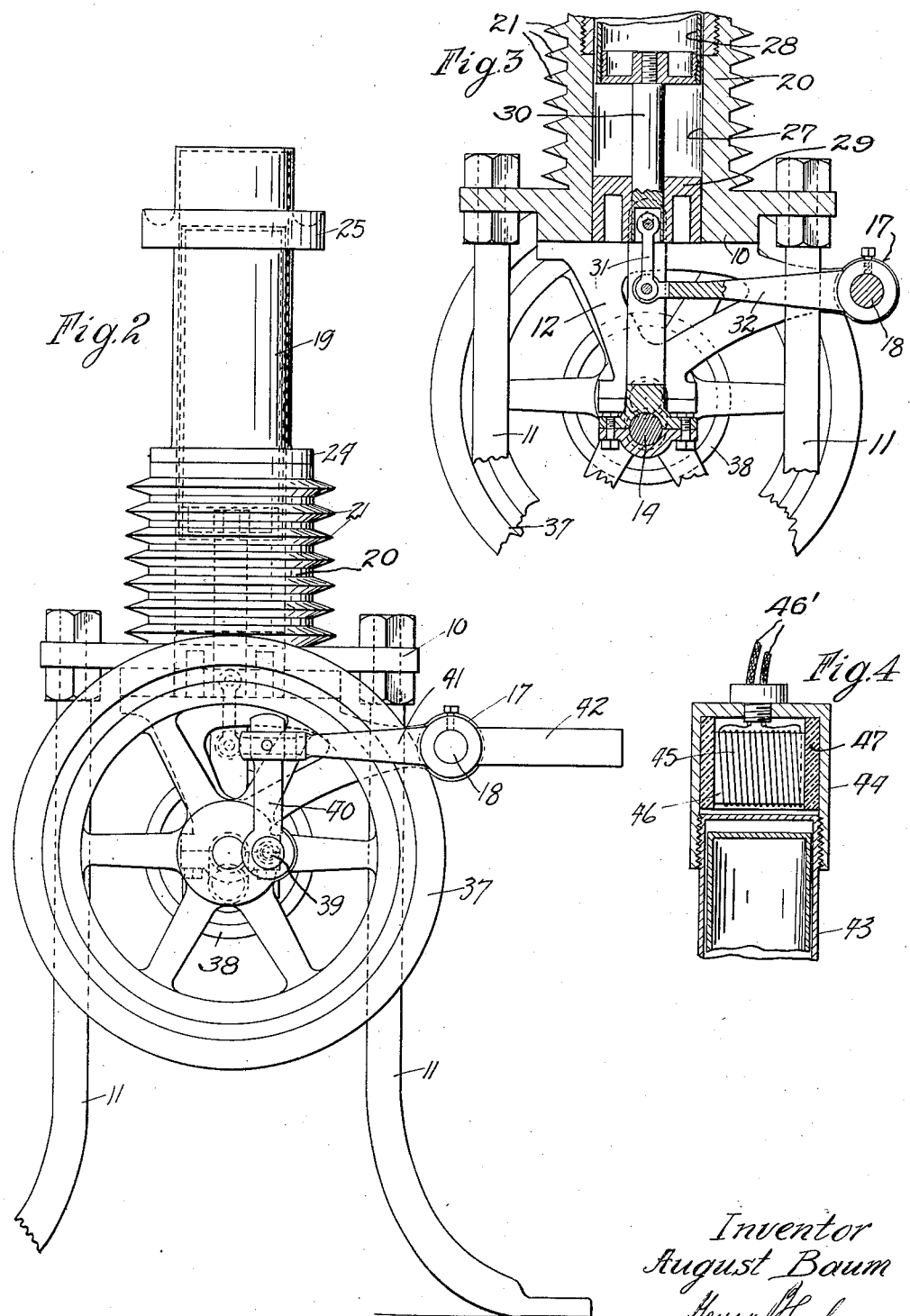

Jan. 13, 1931.  A. BAUM  1,788,558
HOT AIR MOTOR
Filed Nov. 23, 1926  3 Sheets-Sheet 3
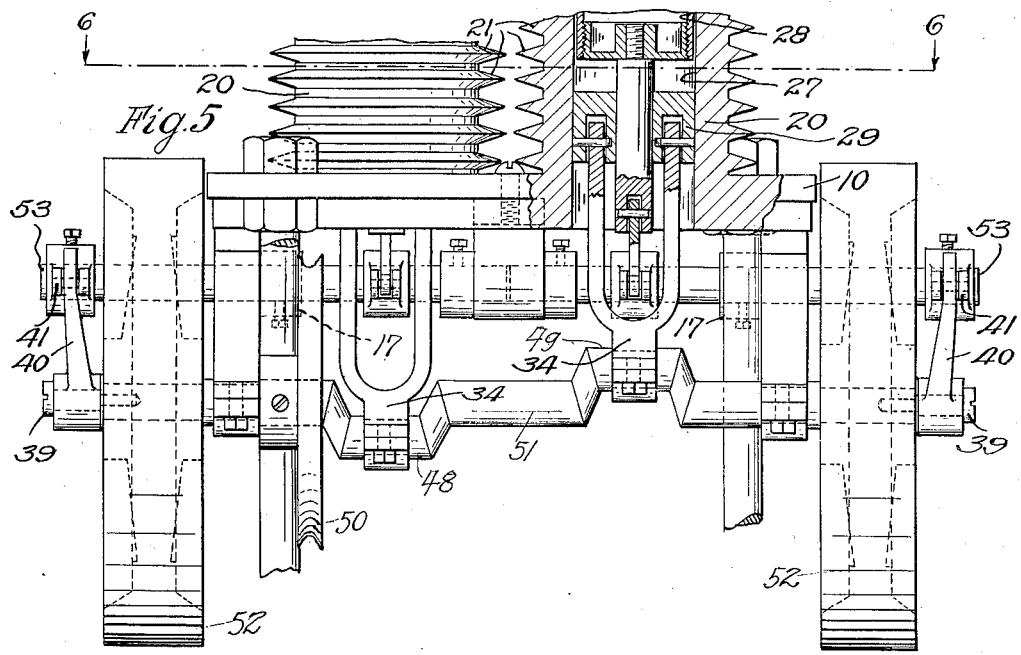
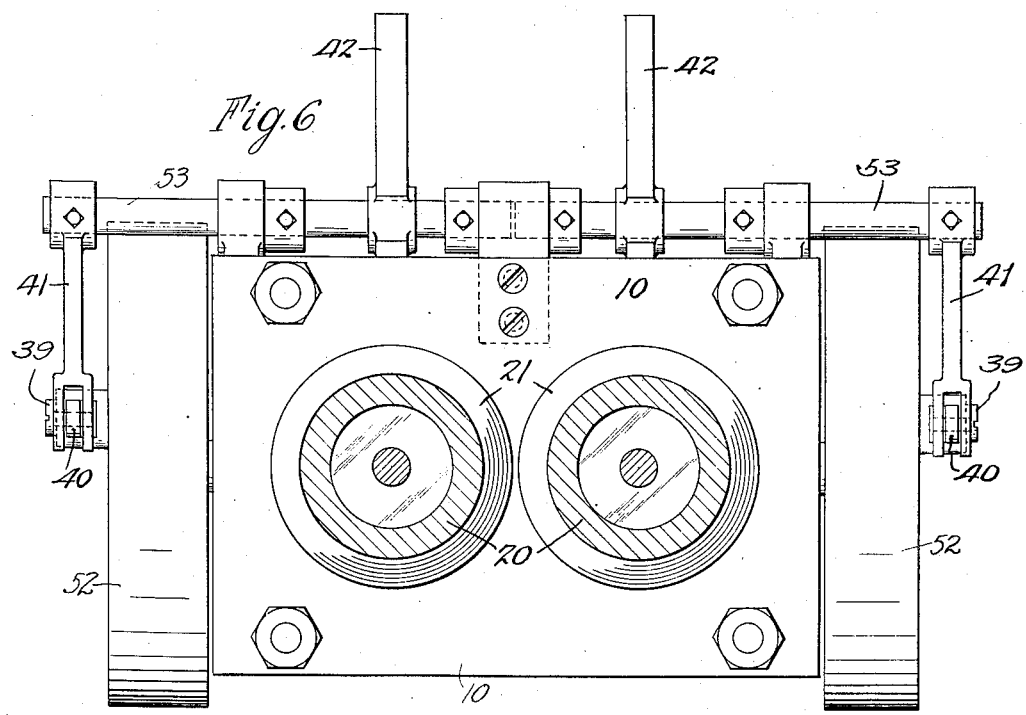
Inventor
August Baum
by Henry Hech
Attorney.

Patented Jan. 13, 1931

1,788,558

UNITED STATES PATENT OFFICE

AUGUST BAUM, OF CHICAGO, ILLINOIS

HOT-AIR MOTOR

Application filed November 23, 1926. Serial No. 150,202.

The invention relates to hot air motors of the type wherein expanded air acts as motive power for the reciprocation of a piston in a cylinder.

It is an object of the invention to provide an inexpensive, yet highly efficient construction of motor which may comprise any desired number of cylinders.

A further object aims at providing electrical means as a source of heat supply for the expansion of the air.

It is also an object to provide certain features of construction and arrangement tending to enhance the efficiency and reliability of a motor of the kind specified.

To the accomplishment of the objects stated and others that will become apparent from the following description, the invention comprises the means described in the following specification, particularly pointed out in the claims forming a part thereof, and illustrated in the accompanying drawings, in which:

Figure 2 is a side view of the motor;

Figure 3 is a fragmentary section on the line 3—3 of Figure 1; and,

Figure 4 is a fragmentary section taken through the upper portion of a modified form of construction for heating the motor.

Figure 5 is a view similar to Figure 1 but showing the cranks in off-set relation, and Figure 6 is a section taken substantially on the line 6—6 of Figure 5.

Figure 1:
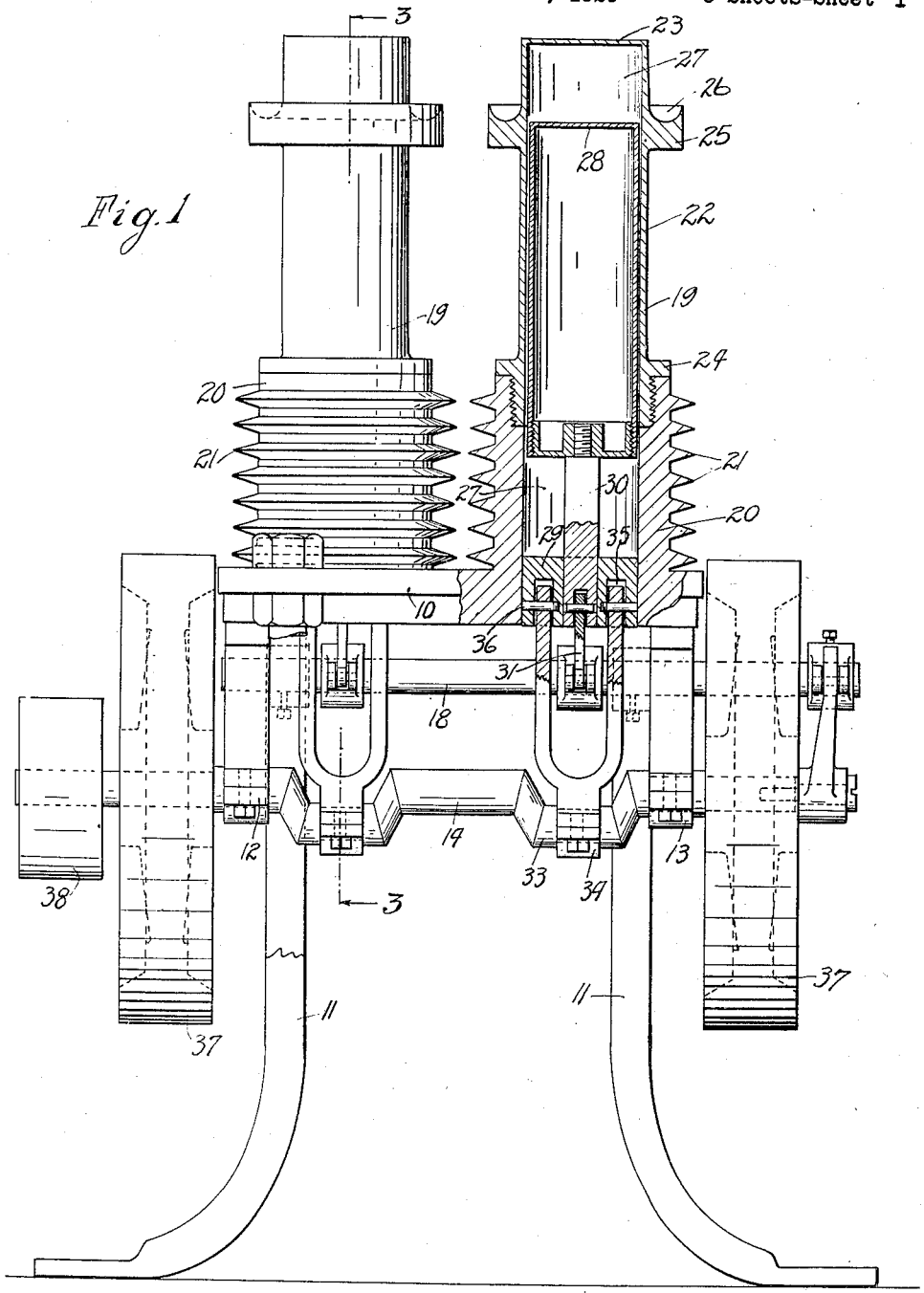
Figure 1 is an elevational view of a two-cylinder motor constructed in accordance with my invention.

The motor is mounted on a table 10 supported by a plurality of legs 11. A pair of pendent bearings 12 and 13 are secured to the underside of the table 10 and have journaled therein a crank shaft 14. A fly wheel is secured to one end of the shaft 14 and a pulley is secured to the opposite end thereof as shown. The pendent bearings are laterally extended to provide bearings 17 for a rock shaft 18. Two vertical cylinders 19 are mounted on the table and as they are of identical construction, the description of one will suffice.

The lower part 20 of each cylinder is preferably integral with the table 10. A plurality of radiating cooling ribs 21 are provided on said lower cylinder portion. The lower cylinder portion is internally threaded at its top to receive the lower threaded end of the upper cylinder portion 22 which is closed at the top 23 and is provided with a flange 24 bearing against the top of cylinder portion 20.

The upper cylinder portion 22 is provided adjacent its top with a circumferential flange 25 having a groove 26 in its upper face constituting a receptacle for fuel which, upon burning, heats the upper end of the cylinder for a purpose hereinafter referred to. The bores of the upper and lower cylinder portions are of the same diameter and register with each other thereby constituting a cylinder chamber 27.

A hollow piston or plunger 28 is loosely disposed in the upper part of chamber 27 and a lower piston 29 fits snugly in the lower portion of said chamber and is provided with a central bore for the free passage of a pitman 30. The pitman 30 is secured, as shown, at its upper end to the lower end of the plunger 28 and is connected at its lower end by a link 31 with an arm 32 on the rock shaft 18.

A connecting member 34 is connected with each crank 33 of the shaft 14 and is bifurcated or forked as shown with its prongs extending into sockets 35 in the corresponding piston 29 and pivotally secured therein by cross pins 36.

The crank shaft is equipped adjacent each end with fly wheels 37 and carries a pulley wheel 38 at one end for the transmission of power therefrom. At its other end, the crank shaft 14 carries an eccentric crank pin 39 connected by a link 40 with a lever 41 on the rock shaft 18 so as to cause oscillations of shaft 18 and arms 32 as shaft 14 rotates. To the shaft 18 is also secured a handle lever 42 which upon actuation causes the crank shaft 14 to revolve and thus serve to overcome dead centers in starting the motor.

The connection of the piston 29 with the crank shaft 14 and the plunger 28 with the rock shaft 18 is so arranged that the plunger leads the piston by a quarter of a revolution, or 90 degrees, whereby the plunger and piston separate from each other during a portion of their strokes and approach each other during another portion of their strokes. Thus, when the piston 29 is in lowermost position, the plunger 28 is in central position but descending. During the continued descent of the plunger, the piston arises, forcing the air past the plunger into the upper part of the cylinder 27 where it is reheated. Then the plunger 28 reverses its direction and rises with the piston 29 compressing the air in the upper portion of the chamber 27 at the same time that said air is being intensely heated by the combustion of fuel in the receptacle or groove 26. In the downward motions of the piston and plunger the piston starts on its downward movement ahead of the plunger, thus causing expansion of the space between them. This expansion is forced by the expansion of the heated air passing the sides of the plunger 28. Then the plunger and piston descend together and the cycle above described is repeated, the air between the plunger and piston being cooled by the action of the cooling flanges 21 during the lower movements of the plunger and piston. In this way continuous rotation of the shaft 14 is effected.

In Figure 4 a slight modification of the means for heating the cylinder is illustrated. Here the upper portion 43 of the cylinder is provided with external threads to engage a threaded casing 44 adapted to surround the upper end of the cylinder. The casing 44 contains a heating coil 45 wound around a mica sheet 46 held in place by a sleeve 47 of insulating material which constitutes a lining for the casing. The coil ends are connected as indicated with electric feed wires 46' with any suitable source of electrical energy and whereby the upper end of the cylinder may be heated to operate the motor as explained above.

The modification shown in Figures 5 and 6 is substantially identical with the construction already described, except that the cranks 48 and 49 are off-set with respect to one another about 180 degrees. A grooved pulley 50 is provided on the chank shaft 51 between the crank 48 and the adjacent fly wheel 52. A rock shaft 53 is connected with the shaft 51 at both ends by means of crank pin 39, link 40 and arm 41 as indicated. The operation of this modification is the same as that already described.

I claim:—

1. A construction of the class described comprising a table; a vertical cylinder on top of said table, the lower portion of said cylinder being formed integrally with said table and provided with cooling flanges, said cylinder opening downwardly through said table; an upper cylinder portion having a threaded connection with said lower cylinder portion and closed at its upper end; a crank shaft mounted on the underside of said table directly below said cylinder; a piston in the lower portion of said cylinder; a forked member connecting said crank shaft with said piston; a hollow plunger loosely fitting the upper portion of said cylinder; a pitman secured to said plunger and passing centrally through said piston into the space between the forks of said connecting forked member; a rocker shaft on the underside of said table and having an operative connection with said crank shaft; a rocker arm on said rocker shaft projecting into the space between the forks of said connecting member and connected with the lower end of said pitman; and means for heating the upper portion of said cylinder.

2. A construction of the class described, comprising a table; a vertical cylinder on top of said table, the lower portion of said cylinder being formed integrally with said table and opening downwardly through the table; cooling flanges on said lower cylinder portion; an upper cylinder portion having threaded connection with said lower cylinder portion and closed at its upper end; a crank shaft mounted on the under side of said table; a piston and a plunger operating in said cylinder and operatively connected with said crank shaft; and means for heating the upper portion of said cylinder.

3. A construction of the class described, comprising a table; a plurality of vertical cylinders in alignment on top of said table, the lower portion of each of said cylinders being formed integrally with said table and opening downwardly through the table; cooling flanges on said lower cylinder portions; an upper cylinder portion having threaded connection with each lower cylinder portion and closed at its upper end; pendant hangers secured to the under side of said table; a crank shaft mounted in said hangers in alignment with said cylinders; a piston and a plunger operating in each of said cylinders and operatively connected with said crank shaft; and means for heating the upper portions of said cylinders.

4. A construction of the class described, comprising a table having suitable legs; a plurality of vertical cylinders in alignment on top of said table, the lower portion of each of said cylinders being formed integrally with said table and opening downwardly through the same; cooling flanges on said lower cylinder portions; an upper cylinder portion having threaded connection with each of said lower cylinder portions and closed at its upper end; two pendant hangers secured to the under side of said table and depending therefrom; a crank shaft mounted in said pendant hangers on the under side of said table directly below and in alignment with said cylinders; a piston in the lower portion of each of said cylinders; a forked member connecting said crank shaft with each of said pistons; a hollow plunger loosely fitting the upper portion of each of said cylinders; a pitman secured to each of said plungers and passing centrally through said pistons into the space between the forks of said connecting members; lateral branches on said pendant hangers; a rocker shaft mounted in said lateral branches on the under side of said table and having an operative connection with said crank shaft; rocker arms on said rocker shaft projecting into the spaces between the forks of said connecting members and connected with the lower end of each of said pitmen; and means for heating the upper portions of said cylinders.

In witness whereof I affix my signature.

AUGUST BAUM.